Patented Apr. 22, 1924.

1,491,131

UNITED STATES PATENT OFFICE.

ELLERY F. COFFIN, OF MUIRKIRK, MARYLAND, ASSIGNOR OF ONE-HALF TO J. H. McCAULEY, OF LAUREL, MARYLAND.

METHOD OF OPERATING BLAST FURNACES.

No Drawing.   Application filed April 11, 1922.   Serial No. 551,652.

*To all whom it may concern:*

Be it known that I, ELLERY F. COFFIN, a citizen of the United States, and resident of Muirkirk, in the county of Prince Georges, in the State of Maryland, have invented certain new and useful Improvements in Methods of Operating Blast Furnaces, of which the following is a specification.

The invention relates to a method of operating blast furnaces with a view to saving a portion of the expensive fuel now used.

It is a well-known fact that in a blast furnace using charcoal as fuel, the consumption of charcoal per ton of metal produced is about three times the amount theoretically necessary to produce a given amount of metal.

At least two-thirds of the reduction of iron ore is brought about by the ascending reducing gases, carbon monoxide and dioxide, which are generated in the tuyère zone of the blast furnace, the furnace being practically a large gas producer as well as a direct carbon reduction furnace. In the production of charcoal pig iron, this reducing gas is produced by a consumption of fuel costing from four to five times as much as the same amount of gas can be obtained from a producer using bituminous coal or refuse coke for the fuel. If then, two-thirds of the charcoal now used be replaced by a volume of cheaply produced reducing gases, equal to the amount of gas this excess fuel would produce, a saving will result amounting to practically fifty percent.

The operation of a blast furnace according to this process, does not disturb the ordinary and regular re-actions taking place, or the widening or shifting of the melting zone, but merely consists in supplying the volume of gas above the theoretically necessary amount, from a cheap source.

My invention consists in supplying this cheaply produced gas at a point sufficiently above the melting zone, so as not to interfere with the re-action at this point. In order that the ore above the melting zone may react under the conditions normally existing in a blast furnace, I introduce the substitute reducing agent in a condition which will duplicate the condition of the furnace at the point of introduction as nearly as possible. Thus the reducing gas must be heated to approximately the temperature at the zone of introduction, but always below the melting point of the ore, and at a pressure substantially equal to or slightly above the existing pressure at the point of introduction.

Any suitable apparatus for the production of the gas and for the heating and compression thereof, may be utilized, and, per se, forms no part of this invention.

It is desirable that the gas introduced into the furnace be of a combustible nature in order to maintain the temperature and the re-action and therefore, if the gas introduced is not naturally combustible, it may be made so by admixtures of air, sufficient being added to cause complete combustion without excess oxidation.

The volume of gas added must in all events, be equal to the amount of gas which the fuel saved would produce under ordinary conditions in the furnace.

Thus, cheaply produced reducing gas preheated to approximately 1,000° F., or about the temperature of the furnace at the zone of introduction, is to be introduced into the furnace under pressure in volume necessary to reduce the ore tonnage of any given capacity of furnace, minus the amount of solid carbon fuel necessary to separate the ore and lime-stone charges, and perform the direct carbon reduction necessary in the lower tuyère melting zone. The burden of ore can in this way be largely increased per ton of solid fuel used, and a correspondingly smaller amount of air blown in to consume the fuel and make gas in the lower tuyère zone. It will be observed that this method of introducing the reducing gas does not change the natural working zones, but merely substitutes gas for solid carbon at a temperature and pressure and air content that will maintain the same working zone at that level or height in the furnace that is produced in regular practice.

Economy results in reducing a much larger amount of ore per ton of solid fuel used, because the equivalent or larger number of B. t. u's. of gas takes the place of the solid fuel of regular practice.

Various sources of reducing gas may be used, such as producing gas, natural gas, or other products having reducing qualities, and I do not wish to be limited to the source of this gas.

Obviously various modifications of this method may be practiced without departing from the spirit of this invention, as I have merely described herein the most satisfactory method of which I am now aware.

Applicant has found that this method may be practiced advantageously in the operation of blast furnaces using coke as fuel, and therefore the invention is not limited to the employment of a reducing gas under the conditions specified for charcoal.

What I claim is:

1. A method of operating a blast furnace which includes the step of introducing a reducing gas into the furnace, the temperature of said gas being substantially equal to that of the zone into which the introduction is made.

2. A method of operating a blast furnace which includes the step of introducing a reducing gas into the furnace, the temperature and pressure of said gas being substantially equal to that of the zone into which the introduction is made.

3. A method of operating a blast furnace which includes the step of introducing a reducing gas into the furnace, the condition of said gas substantially duplicating that of the zone into which the introduction is made, whereby the reaction in that zone is not disturbed.

In testimony whereof, I affix my signature.

ELLERY F. COFFIN.